ns a certain quantity of oil. A pump Q sucks the oil from this box
UNITED STATES PATENT OFFICE.

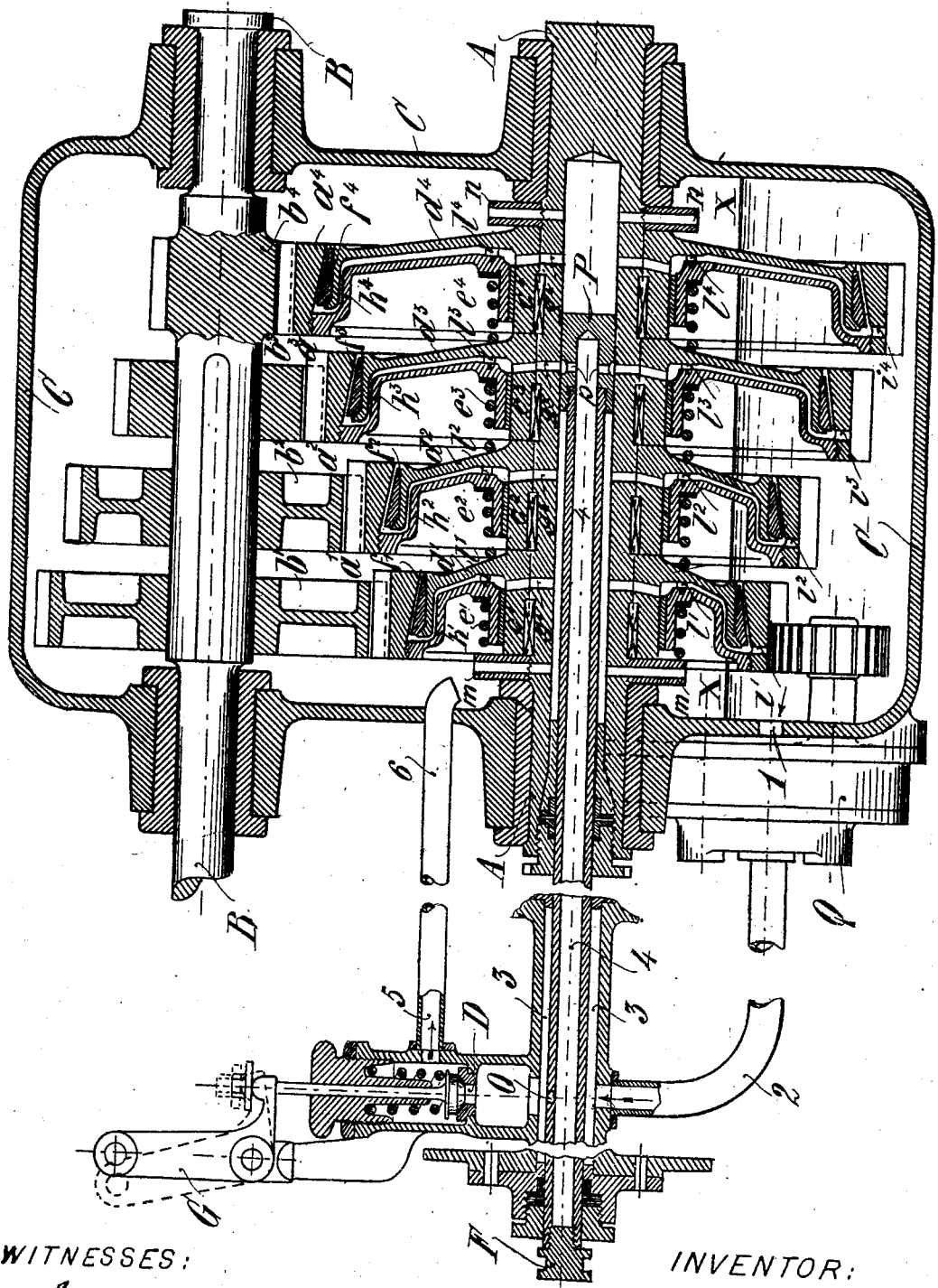

GIOVANNI ENRICO, OF TURIN, ITALY.

SPEED-CHANGING GEAR.

No. 796,990. Specification of Letters Patent. Patented Aug. 15, 1905.

Application filed October 23, 1903. Serial No. 178,237.

*To all whom it may concern:*

Be it known that I, GIOVANNI ENRICO, a subject of the King of Italy, residing at Turin, Italy, have invented certain Improvements Relating to Speed-Change Gear, of which the following is a specification.

This invention has reference to transmission mechanism by means of which the speed ratios between two shafts may be varied, and refers to mechanism of the type in which the distributing device of a liquid under pressure is acted upon for the purpose of coupling with the shaft the desired wheel which is normally loose upon the said shaft.

In order that my said invention may be readily understood and carried into effect, I will describe the same fully with reference to the accompanying drawing, which illustrates in cross-section a clutch for speed-change gear embodying my invention.

The improved mechanism comprises a closed box C, containing a certain quantity of oil. A pump Q sucks the oil from this box through an orifice 1, compresses it in the tube 2 and in the telescopic tube 3, from which it is forced through the orifice O into the tube 4. When the pressure exceeds a certain amount, however, the oil lifts the safety-valve D and returns directly to the box C through the exhaust-tube 5 6.

A and B are the two shafts of which it is desired to vary the transmission ratio. B is the driving-shaft, and A the driven shaft.

$b'$ $b^2$ $b^3$ $b^4$ are the usual gear-wheels keyed upon the shaft B and which mesh with the wheels $a'$ $a^2$ $a^3$ $a^4$, mounted upon the shaft A. The part $h'$ $h^2$ $h^3$ $h^4$ of these latter wheels which carries the toothed crown is arranged in such a manner as to rotate freely upon the hub $c'$ $c^2$ $c^3$ $c^4$ of a disk $d'$ $d^2$ $d^3$ $d^4$, keyed upon the shaft A. The movable part is forced against the fixed part or disk by springs $e'$ $e^2$ $e^3$ $e^4$ and is so shaped with respect to the fixed part, as shown by the drawing, that this latter is comprised in the first part and that its slightly conical crown is applied against an inner crown $f'$ $f^2$ $f^3$ $f^4$ of the fixed part, which is of corresponding conicity, in such a manner that their surfaces are flush. The direction toward which the surfaces $f'$ $f^2$ $f^3$ $f^4$ are inclined is such that the movable member in separating from the fixed member comes into contact with this latter with a pressure which gradually increases in the surfaces $f'$ $f^2$ $f^3$ $f^4$.

The shaft A is hollow, and in this shaft moves the length 4 of the oil-tube with the piston P. The part 4 4 also moves in a similar manner in the body of the telescopic tube 3. The piston P is provided with ports $p$, formed in a distributing-crown, and in the shaft A there are also ports $g'$ $g^2$ $g^3$ $g^4$, which are continued through the hubs $c'$ $c^2$ $c^3$ $c^4$ and terminate in the spaces comprised between the fixed parts $d'$ $d^2$ $d^3$ $d^4$ and the movable parts $h'$ $h^2$ $h^3$ $h^4$, respectively, of the wheels $a'$ $a^2$ $a^3$ $a^4$. The surfaces of two complementary parts are prevented from coming into contact one with the other by suitable stops—for example, by the heads of small screws $l'$ $l^2$ $l^3$ $l^4$. When the distributing-crown of the piston P coincides with one of the series of apertures $g'$ $g^2$ $g^3$ $g^4$—for example, with the series $g^3$—the oil enters between the fixed and movable parts of the corresponding wheel $a^3$ and in causing them to separate produces contact between their respective crowns and their connection on the surface $f^3$. Owing to the conicity of the surfaces which engage, it is possible to maintain between these surfaces in the position of disengagement a very slight normal interval in such a manner that the quantity of liquid which may at the beginning escape through these surfaces becomes negligible and without influence upon the operation. The piston P is operated by hand by the intermediary of a fork engaged in its outer collar F. When the piston is withdrawn from the position of engagement, the action of the corresponding spring $e^3$ causes the two parts of the wheel to again approach, forcing the oil through the hole $g^3$ into the cavity of the shaft A and from this latter into the chamber C through the ports $m$ $m$ or $n$ $n$, according as the piston has moved to the right or toward the left hand.

Between the teeth of the movable crowns are formed one or more exceedingly small holes $i'$ $i^2$ $i^3$ $i^4$, the purpose of which is to render the engagement of the movable and fixed parts more gradual and "gentle." Owing to these holes, a small quantity of oil continues to escape even after the friction-surfaces are in engagement, without, however, appreciably affecting the pressure of the oil itself, and this renders the transmission mechanism less sensible to the sudden variations which the operating-valve may experience by the action of the driver. The most important function of these holes consists, however, in completely discharging the oil inclosed between the fixed and movable parts as soon as the distributing-piston has been withdrawn in order to effect disengagement. As a matter of fact the oil so contained experiences a rapid movement of rotation and is consequently submitted, owing to centrifugal force, to a kind of residual pressure, which prevents it from issuing through the holes $g'\ g^2\ g^3\ g^4$. Discharge through the circumferential holes $i'\ i^2\ i^3\ i^4$, on the other hand, is facilitated by this same centrifugal force, so that disengagement is perfectly effected, which would be almost impossible by the employment of springs only, unless the springs were excessively strong, which would be impracticable as a matter of construction.

The safety-valve D may also be operated by the driver by the intermediary of a pedal or crank-lever, which acts upon the bent lever G in such a manner as to cause it to turn through a small angle and to lift the rod of the valve, which consequently opens. This operating-valve is of great importance as regards the general operation of the mechanism, because it permits of obtaining with a maximum of speed and a minimum of effort the respective engagement and disengagement of the two shafts. In fact, as soon as the valve opens the pressure of the oil ceases between the parts of the driven wheel—$a^3$, for example—which immediately becomes loose upon the shaft. With the same instantaneous action it is coupled with the shaft as soon as the said valve is permitted to close.

Having now particularly described and ascertained the nature of my said invention and in what manner the same is to be performed, I declare that what I claim is—

1. In a fluid-pressure clutch in combination a chamber for fluid, a conduit having two branches, one discharging into the chamber and furnished with pressure-controlling means, and the other discharging at a point to operate the clutch, and means for forcing the fluid from said chamber into said conduit irrespective of the condition of the clutch.

2. The combination of an oil-chamber, a shaft therein, a loose wheel and a disk rotating with said shaft within said chamber, and means for forcing oil from said chamber between said disk and wheel.

3. The combination of an oil-chamber, a shaft therein, a loose wheel and a disk rotating with said shaft within said chamber, means for forcing oil from said chamber between said disk and wheel, and means for returning oil to said chamber.

4. The combination of an oil-chamber, a shaft therein, a loose wheel and a disk rotating with said shaft, having a space between them, means for forcing oil from said chamber directly to said space and a normally open relief-passage leading from said space acting to permit escape of oil therefrom, regardless of the pressure within said space.

5. A clutch having in combination clutch members, a pressure-chamber for operating said members, means for supplying fluid to said chamber, means for manually controlling the pressure in said chamber, and means acting independently of the operation of said controlling means to permit a constant leak from said chamber.

6. A clutch having in combination clutch members, a pressure-chamber for operating said members having a normally open relief-passage, means for supplying fluid to said chamber at a higher rate than it escapes through said passage, and additional means for relieving the pressure in said chamber whereby to release the clutch.

7. The combination of a chamber, a shaft therein, a loose pinion constantly driven by said shaft, a second pinion within said chamber in mesh with the first pinion, a pump operated by said second pinion, adapted to pump fluid from said chamber, a fluid-pressure-clutch mechanism within said chamber, and a connection between said pump and said mechanism, whereby to operate the latter.

8. The combination of a chamber, a shaft therein, a loose pinion constantly driven by said shaft, a disk rotating with said shaft, said disk and pinion in position to form a space between them adapted to receive fluid under pressure, a second pinion in said chamber in mesh with the first pinion, and a pump operated by said second pinion adapted to force fluid into said space.

In witness whereof I have hereunto signed my name in the presence of two subscribing witnesses.

GIOVANNI ENRICO.

Witnesses:
 HUGO FIGGOTTE,
 FELICE BAZETTA.